(12) United States Patent
Cheng et al.

(10) Patent No.: US 12,722,112 B2
(45) Date of Patent: Sep. 1, 2026

(54) SORBENT BED CARTRIDGE, MODULAR SORBENT BED SYSTEM AND METHOD

(71) Applicant: Mosaic Materials, Inc., Alameda, CA (US)

(72) Inventors: Samuel Cheng, Katy, TX (US); Paul Cody, Houston, TX (US); Dustin Kraft, Houston, TX (US); Steven Craig Russell, The Woodlands, TX (US)

(73) Assignee: MOSAIC MATERIALS, INC., Alameda, CA (US)

( * ) Notice: Subject to any disclaimer, the term of this patent is extended or adjusted under 35 U.S.C. 154(b) by 285 days.

(21) Appl. No.: 18/659,423

(22) Filed: May 9, 2024

(65) Prior Publication Data

US 2025/0345737 A1 Nov. 13, 2025

(51) Int. Cl.

*B01D 53/02* (2006.01)
*B01D 53/04* (2006.01)
*B01J 20/28* (2006.01)

(52) U.S. Cl.

CPC .... *B01D 53/0415* (2013.01); *B01J 20/28042* (2013.01); *B01D 2257/504* (2013.01); *B01D 2259/40083* (2013.01)

(58) Field of Classification Search

CPC .... B01D 2257/504; B01D 2259/40083; B01D 53/0415; B01J 20/28042; Y02C 20/40
See application file for complete search history.

(56) References Cited

U.S. PATENT DOCUMENTS 8,268,043 B2 9/2012 Celik et al.
8,545,604 B2 10/2013 Desai et al.
(Continued)

FOREIGN PATENT DOCUMENTS

CN 109364692 B 11/2021
EP 4190428 A1 6/2023
WO 2023084069 A1 5/2023

OTHER PUBLICATIONS

International Search Report and Written Opinion for PCT/US2025/028197; Korean Intellectual Property Office; Mailed Sep. 9, 2025; 8 pages.

(Continued)

*Primary Examiner* — Christopher P Jones
(74) *Attorney, Agent, or Firm* — CANTOR COLBURN LLP

(57) ABSTRACT

A sorbent bed cartridge includes an exoskeleton having an interior space configured to receive a sorbent bed, and a thickness control system to at least substantially maintain a preselected thickness of the bed. A system includes a chamber to hold one or a plurality of the cartridges, which are movable into and out of the chamber. A method of forming the cartridge includes securing the bed within the exoskeleton, and utilizing the thickness control system to maintain the preselected thickness of the bed. A cartridge includes an exoskeleton having first and second side plates and first and second end external plates, the exoskeleton configured to receive a plurality of beds in a predetermined array for carbon capture airflow, and enables movement of the cartridge and the plurality of beds contained therein into and out of a chamber sized to hold a singular or plurality of the cartridges.

18 Claims, 7 Drawing Sheets

(56) References Cited

U.S. PATENT DOCUMENTS

| | | | | |
|---|---|---|---|---|
| 11,007,470 | B2 | 5/2021 | Wurzbacher et al. | |
| 11,331,619 | B1 * | 5/2022 | Gulotta .............. | B01D 53/0446 |
| 2016/0074803 | A1 | 3/2016 | Gebald et al. | |
| 2019/0105597 | A1 | 4/2019 | Meirav et al. | |
| 2019/0299154 | A1 | 10/2019 | Meirav et al. | |
| 2022/0193598 | A1 | 6/2022 | Suter et al. | |
| 2022/0241540 | A1 | 8/2022 | Wang et al. | |

OTHER PUBLICATIONS

Yu, Qian, “Direct Capture of CO2 from Ambient Air using Solid Sorbents;” University of Twente, Oct. 18, 2018; 194 pages.

* cited by examiner

SORBENT BED CARTRIDGE, MODULAR SORBENT BED SYSTEM AND METHOD

BACKGROUND

Fossil fuel combustion generates and releases large amounts of carbon dioxide ("CO2") into the Earth's atmosphere. To slow the rate of CO2 emissions, large emitters, such as coal and natural gas power plants, can be made to capture the CO2 before it is emitted into the atmosphere. However, removal of carbon dioxide (CO2) from gas streams is not limited to such large emitters, and is becoming increasingly common and sometimes required across many industrial sectors, as well as in ambient air and point source carbon capture from any industrial source, with selection of removal technology being driven by the application, the CO2 concentration and the pressure of the feed. Removing carbon dioxide from ambient air for harvesting, sequestration or utilization is also known as direct air capture (DAC) and has become an active area of research by many for climate change mitigation. While there are various approaches for carbon dioxide removal from air (both breathable and ambient), regenerable solid-sorbent systems have emerged as an attractive method for dilute carbon dioxide removal from air, but existing systems still exhibit poor performances.

One focus for the development of CO2 removal has been on the development of various adsorbents used to bind the CO2 from a fluid stream. Adsorbent material acts like a high-capacity molecular sponge to selectively capture CO2. There are a few different classes of solid sorbents capable of adsorbing dilute carbon dioxide, with the most widely used class being amine-functionalized solid adsorbents because the presence of strongly basic amine groups within pores endows the materials for selectivity for carbon dioxide even in the presence of water. Effective materials that can adsorb ranges of carbon dioxide from low ambient levels found in ambient air or atmosphere to industrial applications where the levels are significantly higher are being investigated, including zeolites, mesoporous silicas, and metal-organic framework (MOFs) adsorbents. Amine-appended MOFs, in particular, shows promise for the improved removal of carbon dioxide across several orders of magnitude of concentration from near ambient conditions (e.g., naturally occurring levels) to industrial levels where the carbon dioxide is present at levels in excess of 10,000 ppm.

Both carbon capture of emissions from power and industrial facilities, as well as carbon dioxide removal such as DAC will be needed to meet climate goals and emission reduction targets. Creating economical, scalable and energy efficient DAC systems that can effectively capture CO2 from the atmosphere is important for supply into the CO2 utilization market, including eFuels. Significantly and efficiently reducing as well as eliminating CO2 across multiple industries including hard-to-abate sectors is needed. DAC can work in tandem with emissions controls to lower the aggregate amount of CO2 that is emitted. While emissions capture and improved energy efficiency at industrial sites can reduce current greenhouse gases, DAC can also cut legacy emissions in the atmosphere.

Solid sorbent filter beds are arranged within a carbon capture adsorption chamber to optimize airflow therethrough. Despite the many benefits and potential applications of DAC, the process requires significant improvements in the areas of efficiency, reliability, ease of maintenance, and cost to become more widely adopted.

SUMMARY

An embodiment of a sorbent bed cartridge including an exoskeleton having an interior space configured to receive a sorbent bed, and a thickness control system configured to at least substantially maintain a preselected thickness of the sorbent bed.

An embodiment of a modular sorbent bed system comprising a chamber, the chamber sized to hold one or a plurality of the sorbent bed cartridges, the one or the plurality of sorbent bed cartridges movable into and out of the chamber.

An embodiment of a method of forming the sorbent bed cartridge, the method including securing the sorbent bed within the exoskeleton, and utilizing the thickness control system to maintain the preselected thickness of the sorbent bed.

An embodiment of a sorbent bed cartridge including an exoskeleton having a first side plate, an opposing second side plate, a first end external plate, and an opposing second end external plate, the exoskeleton having an interior space configured to receive a plurality of sorbent beds in a predetermined array for carbon capture airflow, wherein the exoskeleton enables movement of the sorbent bed cartridge and the plurality of sorbent beds contained therein into and out of a chamber sized to hold a singular or plurality of the sorbent bed cartridges

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
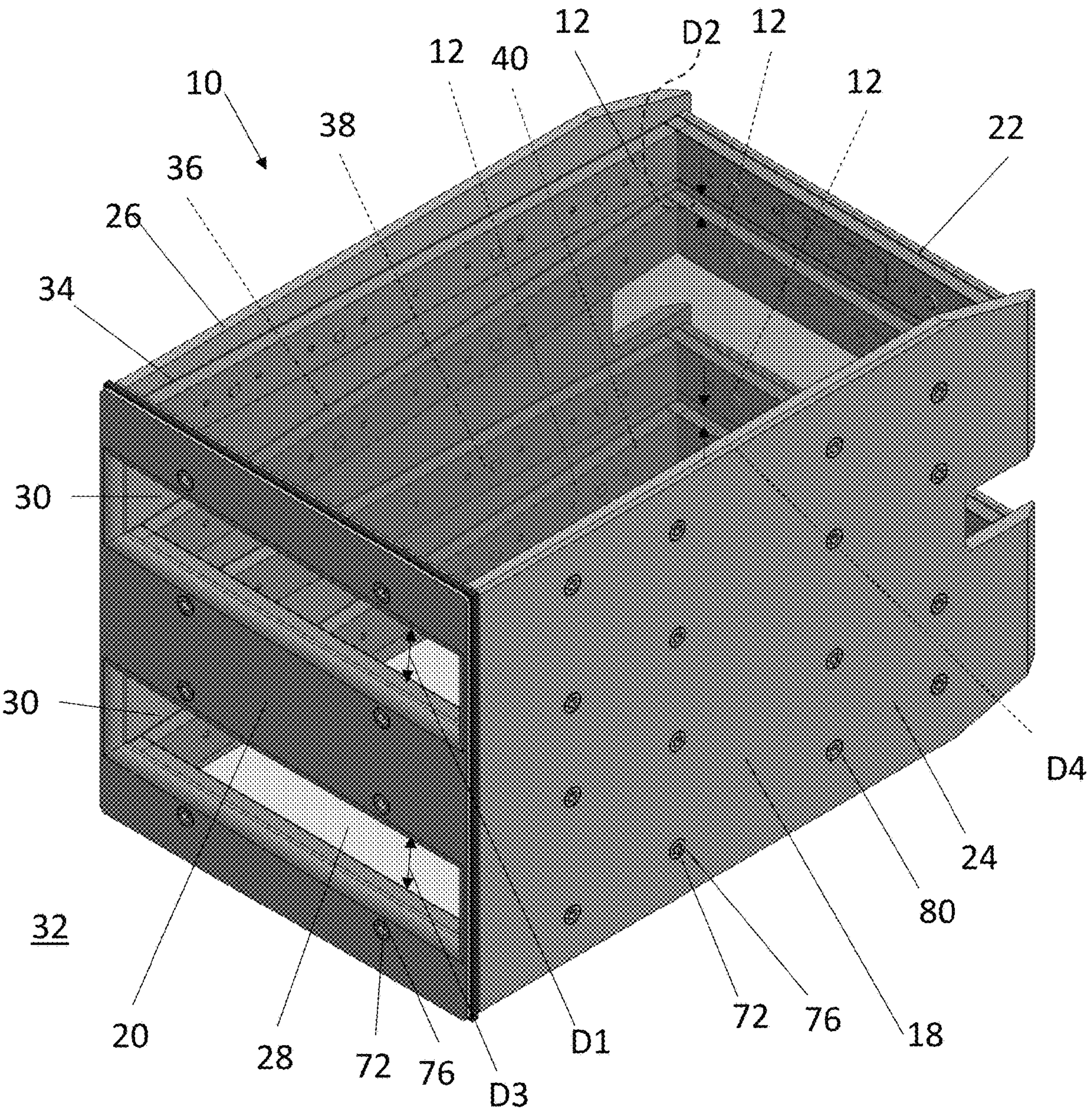
FIG. 1 is a perspective view of one embodiment of a sorbent bed cartridge.
Figure 2:
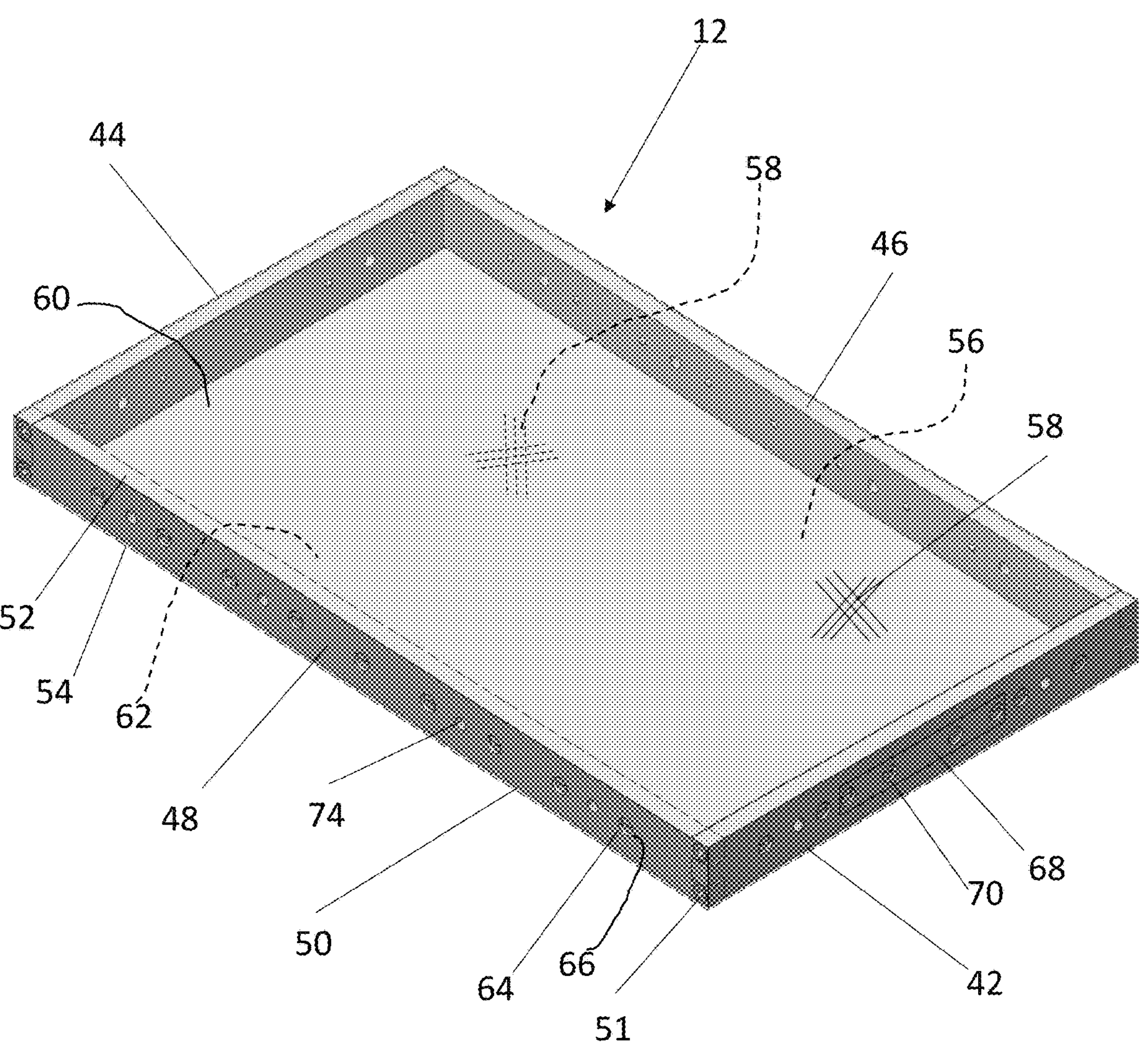
FIG. 2 is a perspective view of one embodiment of a sorbent bed for the sorbent bed cartridge of FIG. 1.
Figure 3A:
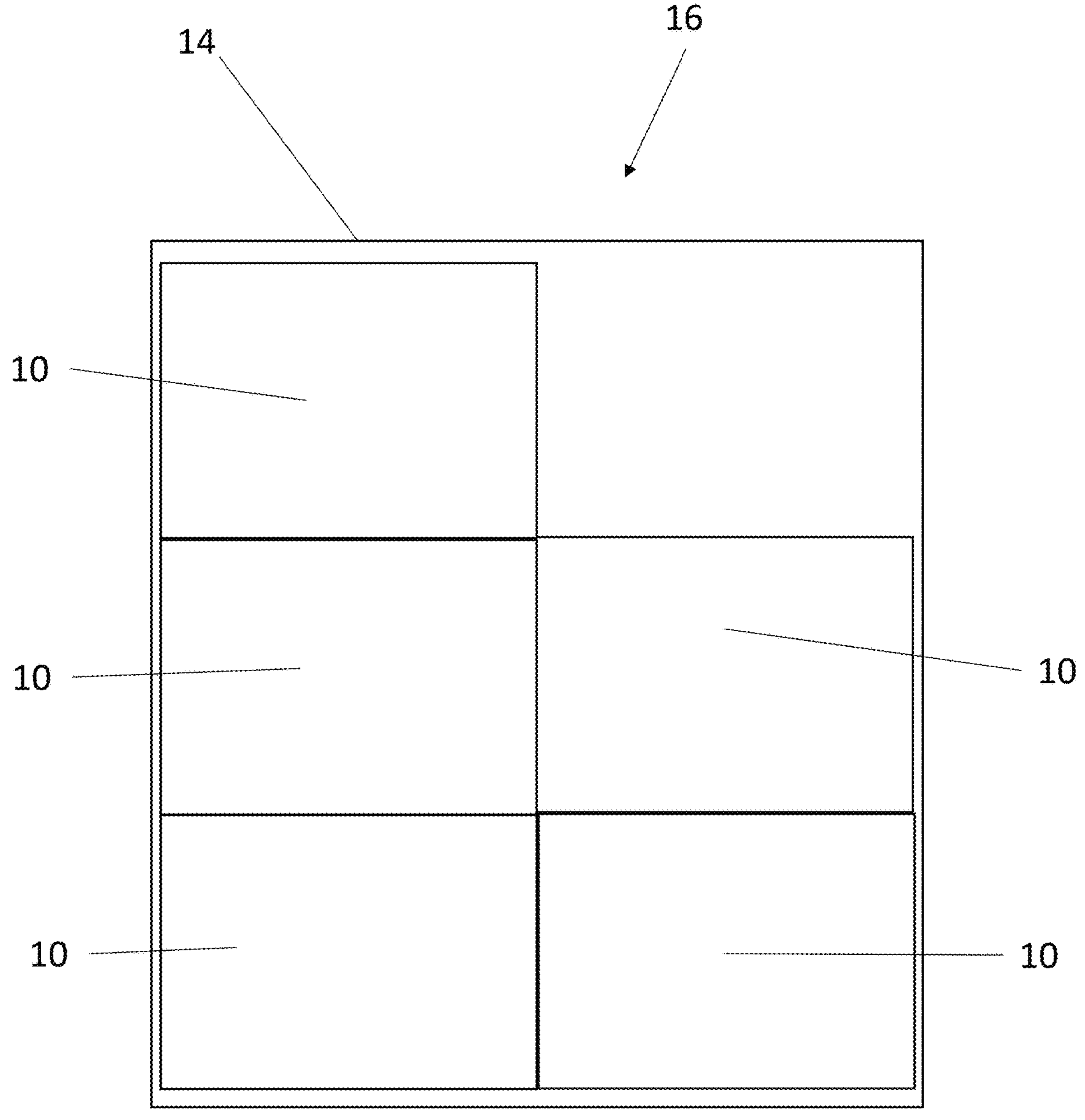
FIG. 3A is a schematic view of one embodiment of a modular sorbent bed system including a plurality of the sorbent bed cartridges of FIG. 1.
Figure 3B:
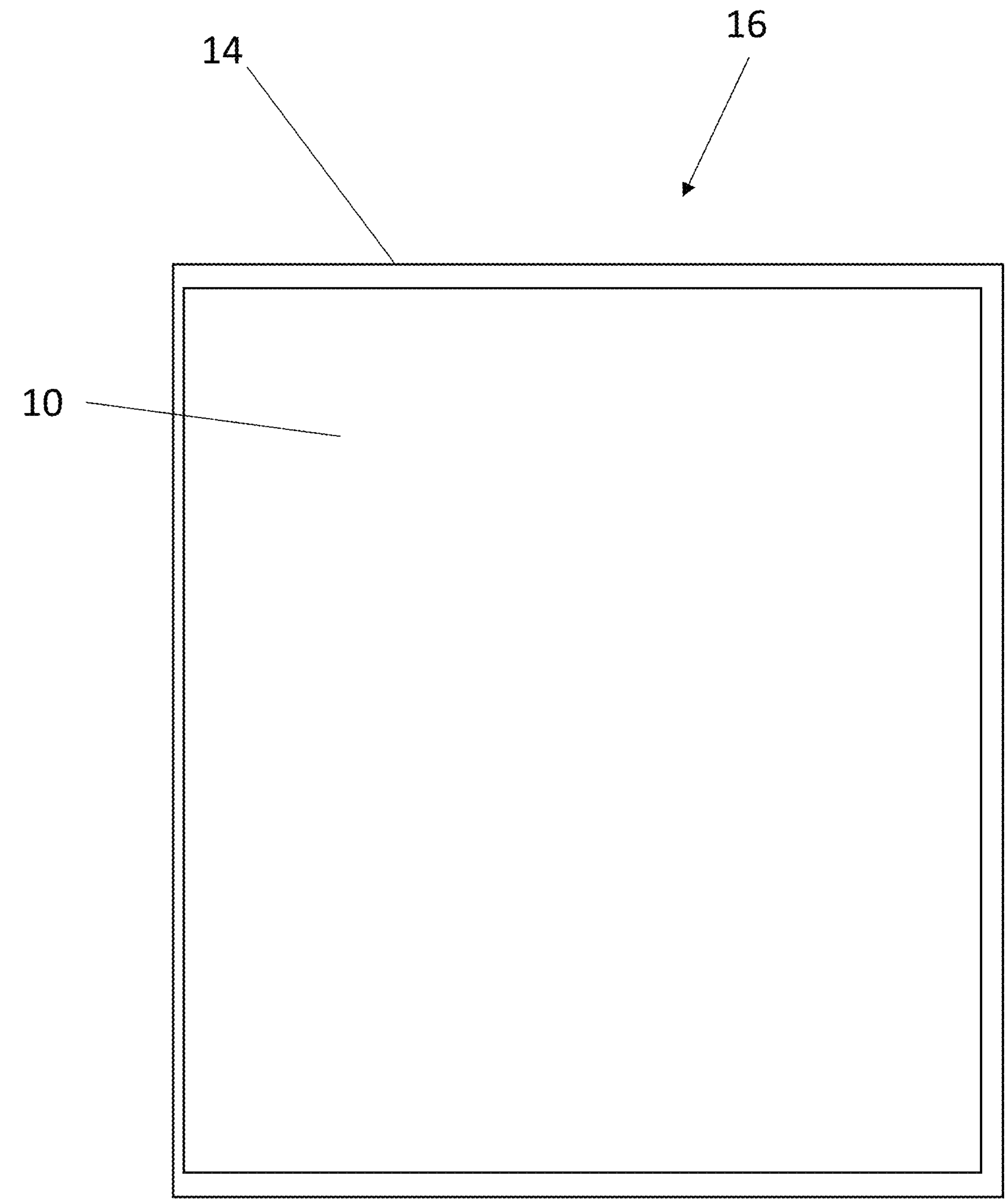
FIG. 3B is a schematic view of another embodiment of a modular sorbent bed system including a single sorbent bed cartridge of FIG. 1.

Referring to FIG. 1, one embodiment of a sorbent bed cartridge 10 is shown. The sorbent bed cartridge 10 locates and secures one or more sorbent beds 12 therein, where one embodiment of sorbent bed 12 is shown in FIG. 2. Once the sorbent beds 12 are secured within the sorbent bed cartridge 10, the sorbent bed cartridge 10 can be inserted within a chamber 14, such as an adsorb and/or desorb vessel, embodiments of which are illustrated in FIGS. 3A and 3B.

The chamber 14 may be a vacuum chamber and can hold a single cartridge 10 or multiple cartridges 10 therein, thus forming a modular sorbent bed system 16, such as a DAC system, that includes a modular design for sorbent packaging, as will be described in more detail below.

The illustrated embodiment of a sorbent bed cartridge 10 shown in FIG. 1 is designed to support four sorbent beds 12 as shown, however it should be understood that the number of support beds 12 supported within the sorbent bed cartridge 10 is not limited by the illustrated embodiment, and the sorbent bed cartridge 10 may be designed to include any number of sorbent beds 12 therein. Likewise, the illustrated embodiment of the chamber 14 shown in FIG. 3A is sized to receive six or less sorbent bed cartridges 10 (with five sorbent bed cartridges 10 shown as an example), however the chamber 14 could be sized to receive any number of sorbent bed cartridges 10 (or sorbent bed cartridges 110 as will later be described with respect to FIGS. 4-6). In the embodiment of the chamber 14 shown in FIG. 3B, the chamber 14 is sized to receive a single sorbent bed cartridge 10 (or 110). Or, alternatively, the chamber 14 shown in FIG. 3A may be the same size as the chamber 14 shown in FIG. 3B, with the difference being the size of the sorbent bed cartridge 10, which is larger than the sorbent bed cartridges 10 illustrated in FIG. 3A. Advantageously, by packaging multiple sorbent beds 12 into a single sorbent bed cartridge 10, moving the sorbent beds 12, such as from one chamber to another, can be accomplished in a single trip. Thus, sorbent movement is simplified int as few steps as possible for a DAC process, particularly where the sorbent beds 12 are required to be regularly moved into and out of a desorption chamber. In such a case, making the sorbent bed cartridge 10 as large as possible to hold as many sorbent beds 12 as possible can minimize the number of movements.

With reference again to FIG. 1, the sorbent bed cartridge 10 includes an exoskeleton 18, which serves as an external support structure to which the individual sorbent beds 12 are secured. The illustrated exoskeleton 18 includes four plates 20, 22, 24, 26, including a first end external plate 20, a second end external plate 22, a first side plate 24 and an opposing second side plate 26. The first and second end external plates 20, 22 channel airflow into an interior space 28 of the exoskeleton 18 via one or more openings 30, from an exterior source 32, allowing airflow through the sorbent beds 12. The plates 20, 22, 24, 26 form the exoskeleton 18, and the individual sorbent beds 12 are fastened thereto. The plates 20, 22, 24, 26 perform multiple functions. They locate and secure the sorbent beds 12 in the prearranged configuration that is optimized for airflow and optimal carbon dioxide uptake. At least the first end external plate 20 channels the airflow into the sorbent beds 12, to ensure optimal airflow through the sorbent bed cartridge 10. The plates 20, 22, 24, 26 further support a thickness control system 80, as will be further described below, for maintaining the preselected thickness of the sorbent beds 12. The exoskeleton 18 is also sufficiently structurally rigid for moving the sorbent bed cartridge 10, and the sorbent beds 12 therein, into and out of the chamber 14. While various materials may be utilized to manufacture the sorbent bed cartridge 10, in one embodiment the exoskeleton 18, fasteners (such as fasteners 51, 64, 70, 72 described further below), and at least portions of the sorbent beds 12 as will be further described below may be formed of non-metallic materials, such as but not limited to polypropylene, PEEK, and other plastics and microwave transparent materials, such as low dielectric loss tangent materials, rendering the sorbent bed cartridge 10 suitable for use in a microwave with radio frequency ("RF") regeneration.

To ensure optimal airflow through the sorbent beds 12, the sorbent beds 12 are arranged in a structured manner within the exoskeleton 18. The individual sorbent beds 12 are fastened within the exoskeleton 18, and can be individually fastened, at predetermined angles relative to each other for ensuring the optimal airflow. The exact relative angles between the sorbent beds 12 for achieving the optimal airflow through the sorbent beds 12 will be determined by many factors including, but not limited to, the size of the sorbent bed cartridge 10, the size of the sorbent beds 12, the geometry of the sorbent beds 12, the material used in the sorbent beds 12, the type of source 32 and the rate of flow from the source 32. In the illustrated embodiment, first and second sorbent beds 34, 36 are arranged so as to be not parallel to each other, and likewise third and fourth sorbent beds 38, 40 are arranged so as to be not parallel to each other. In one embodiment, a distance D1 between the first and second sorbent beds 34, 36 at the first end external plate 20 is greater than a distance D2 between the first and second sorbent beds 34, 36 at the second end external plate 22. Similarly, a distance D3 between the third and fourth sorbent beds 38, 40 at the first end external plate 20 is greater than a distance D4 between the third and fourth sorbent beds 38, 40 at the second end external plate 22. As in the illustrated embodiment, the distances D1 and D3 may be equal or substantially equal, and the distances D2 and D4 may be equal or substantially equal, such that the angle between the first and second sorbent beds 34, 36 is equal or substantially equal to the angle between the third and fourth sorbent beds 38, 40. In a further more particular embodiment, the first and third sorbent beds 34, 38 may be parallel or at least substantially parallel to each other, and the second and fourth sorbent beds 36, 40 may be parallel or at least substantially parallel to each other. While four sorbent beds 34, 36, 38, 40 have been illustrated and described, it should be understood that the sorbent bed cartridge 10 could be sized to house any number of sorbent beds 12 therein and that the sorbent beds 12 could be arranged in a similar pattern as described above or in any pattern suited to optimal flow within the sorbent bed cartridge 10.

With reference now to FIG. 2, one embodiment of the sorbent bed 12 will now be described in detail. The sorbent bed 12 includes a first end wall 42 (to be located at an inflow end or front end within the sorbent bed cartridge 10, adjacent the first end external plate 20) and an opposing second end wall 44 (to be located at an outflow end or rear end within the sorbent bed cartridge 10, adjacent the second end external plate 22). The first and second end walls 42, 44 may be parallel or at least substantially parallel to each other as illustrated. The sorbent bed 12 also includes a first side wall 46 and an opposing second side wall 48. The first and second side walls 46, 48 may be parallel or at least substantially parallel to each other as illustrated. The first and second end walls 42, 44 may be perpendicular or at least substantially perpendicular to the first and second side walls 46, 48. Thus, the first and second end walls 42, 44 and the first and second side walls 46, 48 form a frame 50 of the sorbent bed 12. The first end wall 42 may be secured to the first and second side walls 46, 48, and the second end wall 44 may be secured to the first and second side walls 46, 48 using any sort of joint, such as, but not limited to, the illustrated box joint connection and frame fasteners 51. Alternatively, the frame 50 may be injection molded, machined from a single billet, or made from multiple members fused and/or adhered together to be formed as a single piece.

The frame 50 has a first edge 52, such as a top edge, and an opposing second edge 54, such as a bottom edge (although orientation is not restricted in some embodiments). In the illustrated embodiment, the frame 50 has a rectangular or at least substantially rectangular shape, and therefore the first edge 52 and second edge 54 likewise have a rectangular or at least substantially rectangular shape. A thickness of the sorbent bed 12 is measured from the first edge 52 to the second edge 54. In some embodiments the thickness is constant throughout the frame 50. However, in other embodiments, the thickness of the frame 50 is different at the first end wall 42 than at the second end wall 44. For example, the thickness of the frame 50 at the second end wall 44 may be greater than the thickness at the first end wall 42. In such an embodiment, the thickness of the frame 50 may be tapered from the second end wall 44 to the first end wall 42 such that a height of the first and second side walls 46, 48 is greater adjacent to the second end wall 44 than adjacent to the first end wall 42.

The sorbent bed 12 includes at least one type of sorbent material 56 that is capable of selectively removing CO2 from fluid flow. In a preferred embodiment, the sorbent material is a porous, solid-phase material such as, but not limited to, metal-organic framework ("MOF"), zeolites and mesoporous silicas. Amine impregnated solids may also be considered to increase the CO2 adsorption capacity of porous solid materials. In some embodiments, the sorbent material 56 may have a sorbent particle size with a diameter in a range of about 0.4 mm to about 2.0 mm and a length in a range of about 0.4 mm to about 15.0 mm. Other materials and dimensions not specifically disclosed herein that are capable of removing CO2 from fluid flow may also be used in the sorbent bed 12 to take advantage of embodiments of the disclosed invention. The sorbent bed cartridge 10 may include a single sorbent bed 12 or alternatively multiple sorbent beds 12 made from the same material 56 or made from different materials 56 from each other to provide for layers or stages of CO2 removal.

The sorbent beds 12 also include a fine mesh support, hereinafter more simply referred to as mesh 58, a small portion of a diagrammatic depiction of the mesh 58 shown in FIG. 2. The mesh 58 is utilized to surround, such as substantially encase, the sorbent material 56, and the mesh openings in the mesh 58 are small enough to hold the sorbent particles of the sorbent material 56 within the sorbent beds 12 without passing through the mesh openings. The mesh 58 is a flexible fabric that is wrapped around the frame 50. The mesh 58 is very fine mesh and may be, but is not limited to, 32 to 20 mesh, or about 500 to about 850 microns. As shown in FIG. 2, the mesh 58 surrounds the sorbent material 56 to form a first airflow surface 60 and a second airflow surface 62 of the sorbent bed 12, where the first airflow surface 60 is substantially aligned with the first edge 52 of the frame 50 and the second airflow surface 62 is substantially aligned with the second edge 54 of the frame 50. The mesh 58 may be made of one or more pieces of mesh material which, in one embodiment, at least partially surrounds the frame 50 as shown and then may be secured to the frame 50 using a securement such as, but not limited to, one or more mesh fasteners 64 that pass through one or more apertures 66 which extend through the first end wall 42, second end wall 44, first side wall 46, and/or second side wall 48. Alternatively, the mesh 58 may be made into a continuous bag/wrap of mesh material sewn together and then enveloped over the frame 50. In such an embodiment, the mesh fasteners 64 may not be necessary. Other embodiments of securing the mesh 58 to the frame 50 are within the scope of these embodiments, including, but not limited to, gluing or otherwise adhering the mesh 58 to the frame 50, and also securing the mesh 58 to other locations of the frame 50 such as, but not limited to, the first and second edges 52, 54 of the frame 50. In any of the above described embodiments, the mesh 58 is supported by the frame 50, and the mesh 58 supports the sorbent material 56 within the frame 50.

The sorbent bed 12 may further include one or more loading plates 68, which may be removable from the frame 50 such as for pellet loading (e.g. MOF pellet loading) of the sorbent material 56 within the sorbent bed 12 and between the first and second airflow surfaces 60, 62 of the mesh 58. The loading plate 68 may be secured to the frame 50 using any suitable securement, such as the illustrated one or more loading plate fasteners 70.

In the illustrated embodiment shown in FIG. 1, the sorbent beds 12 are securable within the sorbent bed cartridge 10 using one or more tensioning fasteners 72 that pass through openings 76 in the exoskeleton 18 of the sorbent bed cartridge 10 as well as through openings 74, which may be threaded holes, (FIG. 2) in the frame 50 of the sorbent beds 12. The openings 74 in the frame 50 align, or at least substantially align, with the openings 76 in the exoskeleton 18 when the sorbent bed 12 is positioned for installation within the exoskeleton 18, for passage of a tensioning fastener 72 through the aligned pair of openings 74, 76. The number of openings 74, 76 may vary depending on the size of the sorbent bed cartridge 10. In the illustrated embodiment, each sorbent bed 12 includes four openings 74 on each of the first and second side walls 46, 48 and two openings 74 on each of the first and second end walls 42, 44. Likewise, for each of the locations where a sorbent bed 12 can be seated within the exoskeleton 18, the exoskeleton 18 includes four openings 76 on each of the first and second side plates 24, 26 and two openings 76 on each of the first and second end external plates 20, 22 that are alignable, respectively, with the openings 74 in the frame 50. In the illustrated embodiment, because the cartridge 10 includes four sorbent beds 12, there are sixteen openings 76 on each of the first and second side plates 24, 26 and eight openings 76 on each of the first and second end external plates 20, 22. Furthermore, the openings 76 in the exoskeleton 18 are arranged so that the installed sorbent beds 12 have the desired angle with respect to its adjacent sorbent bed(s) 12. For example, the distance between the openings 76 on the first and second side plates 24, 26 that are most adjacent to the second end external plate 22 for the first and second sorbent beds 34, 36 is smaller than the distance between the openings 76 on the first and second side plates 24, 26 that are most adjacent to the first end external plate 20 for the first and second sorbent beds 34, 36. While a particular arrangement of openings 74, 76 has been illustrated and described, it should be understood that alternate arrangements are within the scope of these embodiments. For example, in some embodiments, more or less openings 74, 76 may be utilized on the first and second side walls 46, 48 and first and second side plates 24, 26, respectively. Also, as another example, some embodiments may not require any openings 74, 76 or may require additional openings 74, 76 on the first and second end walls 42, 44 and first and second end external plates 20, 22, respectively.

The sorbent beds 12 include a specified bed thickness, such as, but not restricted to, a range of about 0.5 inches to about 2.5 inches, which can be used to control a variety of process parameters including but not limited to pressure drop, adsorption rate, and adsorption uniformity across the sorbent bed 12. One such embodiment of the sorbent bed 12 is a sorbent bed 12 having a constant bed thickness, such as the thickness measured from the first edge 52 to the second edge 54 as previously described. Other embodiments of sorbent beds 12 may include a variable bed thickness from the first end wall 42 to the second end wall 44, such that the thickness of the sorbent bed 12 at the first end wall 42 is smaller or larger than the thickness of the sorbent bed 12 at the second end wall 44. More particularly, and in a preferred embodiment of a sorbent bed with a variable thickness, the sorbent beds 12 have a smaller thickness at the first end wall 42 than at the second end wall 44, such as, but not restricted to, a ratio of about 1.1 to about 1.6 between the first end wall 42 and the second end wall 44 (where the thickness of the second end wall 44 is in a range of about 1.1 to about 1.6 times greater than a thickness of the first end wall 42). Even more particularly in such embodiments, the thickness of the sorbent beds 12 increases gradually from the first end wall 42 to the second end wall 44. Yet even more particularly in such embodiments, the thickness of the sorbent beds 12 increases substantially uniformly from the first end wall 42 to the second end wall 44. In some embodiments, the variable thickness of the sorbent beds 12 can be used to control pressure drop, improve air flow distribution, promote uniform air flow, and promote uniform residence time of fluid (such as air) in contact with the sorbent material 56 of the sorbent beds 12, as compared to a sorbent bed 12 having constant thickness. Regardless of the chosen thickness or thicknesses of the sorbent beds 12, it has been determined herein that maintaining the preselected thickness of the sorbent beds 12 is important in achieving the desired pressure drop, air flow distribution, residence time, etc.

After the sorbent material 56 is installed within the mesh 58 of the sorbent bed 12, the thickness of the sorbent bed 12 between the first and second airflow surfaces 60, 62 should be as preselected (regardless of whether the sorbent bed 12 has a preselected constant thickness or a preselected variable thickness as described above), or as close as possible to the preselected thickness, when using the sorbent bed cartridge 10. In some cases, materials for the frame 50 are chosen such that the frame 50 may bow or slightly bow from the weight of the sorbent material 56. For example, the frame 50 may be relatively thin or made of a plastic material, such as but not limited to polypropylene which has comparatively less strength than certain metallic materials. Thus, the sorbent bed cartridge 10 includes a thickness control system 80 for at least substantially maintaining the preselected thickness of the installed sorbent bed 12. For ensuring airflow, the thickness control system 80 preferably does not obstruct or at least does not significantly obstruct airflow through the sorbent material 56 of the sorbent bed 12. In the embodiment depicted in FIG. 1, the thickness control system 80 includes the tensioning fasteners 72 as one embodiment of a thickness control feature within the thickness control system 80. As previously described, the tensioning fasteners 72 secure the sorbent beds 12 within the exoskeleton 18 by passing through aligned openings 76 in the exoskeleton and openings 74 in the frame 50. Additionally, the tensioning fasteners 72 are utilized, such as by turning the head of the tensioning fasteners 72 that are exposed and available exteriorly of the exoskeleton 18 to turn the threaded shaft of the tensioning fasteners 72 within the mating threaded openings 74, 76, to pull the frame 50 towards the exoskeleton 18 and thus tensioning the mesh 58 that is supported by the frame 50 and that supports the sorbent material 56 therein. In other words, when the tensioning fasteners 72, such as screws or cap screws, ratcheting rivet, and/or a stud and nut combination, are torqued, the tensioning fasteners 72 pull the frame 50 outward towards the exoskeleton 18, at least substantially removing any sagging in the frame 50, and thus stretches and tensions the mesh 58 that is attached to or otherwise supported by the frame 50 to bring the bed thickness to the preselected thickness. Thus, the tensioning fasteners 72 are included in the thickness control system 80 as a thickness control feature to maintain the thickness of the sorbent bed 12 at its preselected thickness by tensioning the mesh 58. Advantageously, the tensioning fasteners 72 also secure the sorbent bed 12 within the cartridge 10 and do not impede airflow through the sorbent bed 12. The thickness control system 80 may include additional embodiments of thickness control features as will be further described below.

Figure 4:
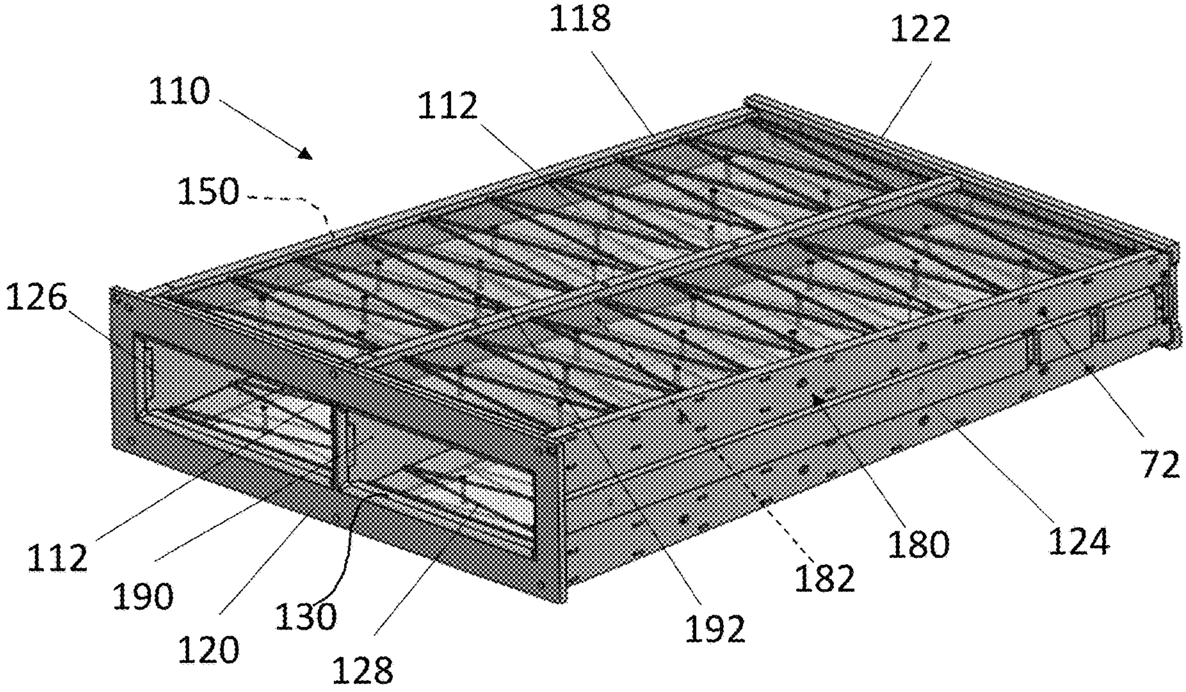
FIG. 4 is a perspective view of another embodiment of a sorbent bed cartridge.
Figure 5:
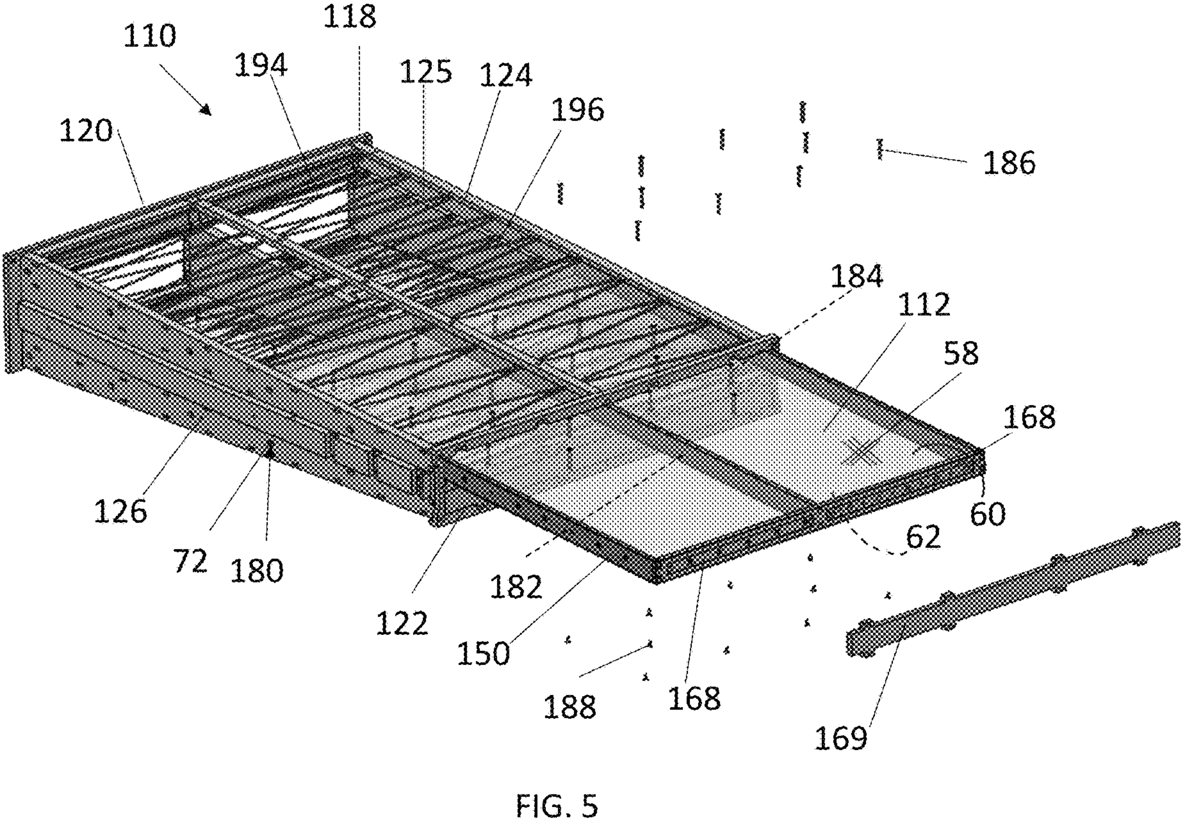
FIG. 5 is a partially exploded perspective view of the sorbent bed cartridge of FIG. 4.
Figure 6:
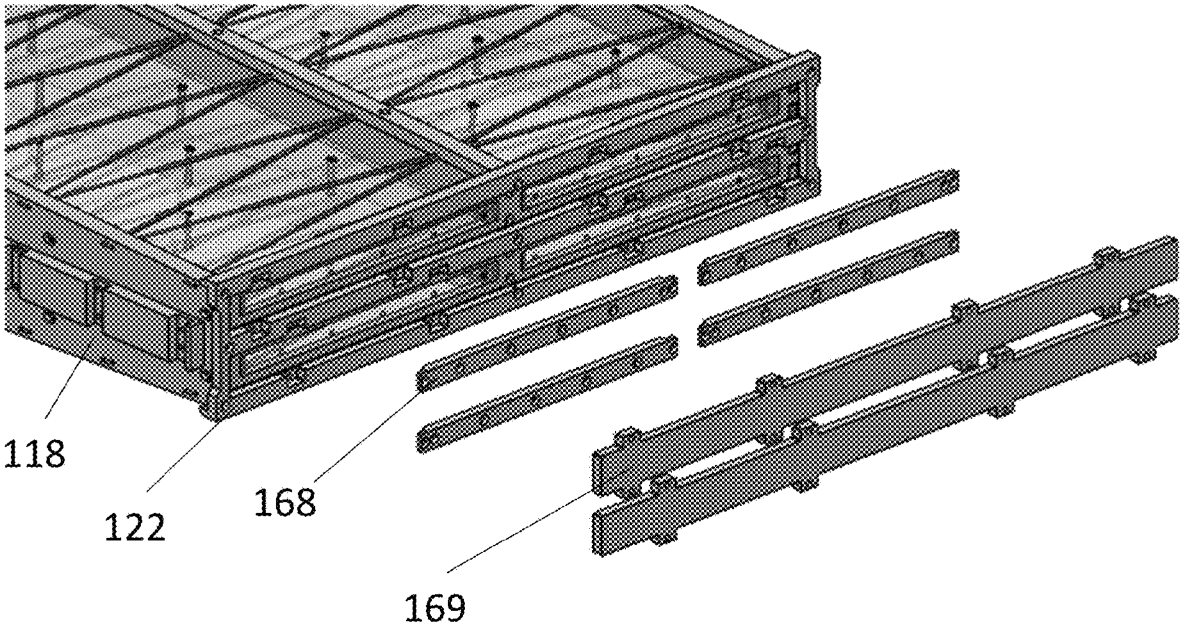
FIG. 6 is a partially exploded perspective view of the sorbent bed cartridge of FIG. 4.

With reference now to FIGS. 4-6, an alternate embodiment of a sorbent bed cartridge 110 is depicted. The sorbent bed cartridge 110 is similar to the sorbent bed cartridge 10 in that it locates and secures one or more sorbent beds 112 therein. Once the sorbent beds 112 are secured within the sorbent bed cartridge 110, the sorbent bed cartridge 110 can be inserted within a chamber 14, such as an adsorb and/or desorb vessel, one embodiment of which is illustrated in FIG. 3. The chamber 14 can hold multiple cartridges 110 therein, thus forming a modular sorbent bed system 16.

While the sorbent bed cartridge 110 includes many similar features to the sorbent bed cartridge 10, some differences will be described. The illustrated sorbent bed cartridge 110 is sized to hold no more than two sorbent beds 112. However, as previously noted, a sorbent bed cartridge 10, 110 can be designed to support any number of sorbent beds 12, 112 therein. The sorbent bed cartridge 110 includes an exoskeleton 118 having first and second end external plates 120, 122 and first and second side plates 124, 126. The first and second side plates 124, 126 may include, on interior surfaces thereof, one or more guiding structures 125 (FIG. 5) such as but not limited to a rail or shelf. The sorbent beds 112 may slide upon or relative to the guiding structures 125 for guiding the sorbent beds 112 during insertion into the sorbent bed cartridge 110.

As in the sorbent bed cartridge 10, the first and second end external plates 120, 122 channel airflow into an interior space 128 of the exoskeleton 118 via one or more openings 130, allowing airflow through the sorbent beds 112. Also, to ensure optimal airflow through the sorbent beds 112, the sorbent beds 112 are arranged in a structured manner within the exoskeleton 118 and at predetermined angles relative to each other for ensuring the optimal airflow, as previously described in the sorbent bed cartridge 10. The sorbent bed 112 may further include one or more loading plates 168, which may be removable from a frame 150 of the sorbent bed 112 such as for pellet loading (e.g. MOF pellet loading) of the sorbent material 56 within the sorbent bed 112 and between the first and second airflow surfaces 60, 62 of the mesh 58 as previously described and as shown in FIGS. 5 and 6. The sorbent bed cartridge 110 may further include one or more backplates 169 securable to the second end external plate 122 of the exoskeleton 118 which can be used to secure the sorbent bed 112 within the exoskeleton 118, while the second end external plate 122 blocks airflow between the sorbent beds 112 from the second end external plate 122. The airflow from the openings 130 enters interior space 128 and passes through the first and second airflow surfaces 60, 62 and sorbent material 56 of the sorbent beds 112. The backplates 169 may include protrusions (and/or grooves) that are respectively received by matching grooves (and/or protrusions) in the second end external plate 122 such that the back plates 169 can be easily mated to the second end external plate 122 and then secured thereto, such as by screws or other fasteners.

For maintaining thickness of the sorbent bed 112 at the preselected thickness, the sorbent bed cartridge 110 includes a thickness control system 180. The tensioning fasteners 72 are included in the thickness control system 180 as a thickness control feature to maintain the thickness of the sorbent bed 112 at the preselected thickness by tensioning the mesh 58 surrounding the frame 150 of the sorbent bed 112. The frame 150 is similar to the previously described frame 50 of sorbent bed 12, where the frame 150 can be secured to the exoskeleton 118 using the tensioning fasteners 72 and selectively tensioned to tighten the mesh 58. The thickness control system 180 may further include a frame support beam 182 (or a plurality of frame support beams 182) that spans a length (and/or spans a width) of the frame 150. The thickness control system 180 may further include one or more spacers 184, such as barrel nut spacers or any sort of mechanical spacer that spans a thickness of the sorbent bed 112 and provides the thickness control system 180 with an additional thickness control feature by forcing the first and second airflow surfaces 60, 62 of the mesh 58 to maintain the thickness of the sorbent bed 112 as determined by the length of the spacer 184. The spacer 184 may include a spacing rod 186 and securement device 188 that pins the spacing rod 186 in place relative to the mesh 58. In the illustrated embodiment, a plurality of spacers 184 are spaced apart in regular intervals across the mesh 58, such as in a quilted fashion.

For additional structural rigidity, the sorbent bed cartridge 110 may further include a support plate 190 (FIG. 4) that spans a length of the exoskeleton 118 from the first end external plate 120 to the second end external plate 122 and separates the sorbent beds 112 from each other. The sorbent bed cartridge 110 may further or alternatively include one or more support plates 190 that span the length and/or width of the exoskeleton 118. The sorbent bed cartridge 110 may further include support beams 192 that span a length of the exoskeleton 118 from the first end external plate 120 to the second end external plate 122 such that the respective sorbent bed 112 is positioned between the support plate 190 and the support beam 192. In additional embodiments, the sorbent bed cartridge 110 may also include a filter support system 194 in the form of filaments 196 that span the width and/or length of the exoskeleton 110 such that the respective sorbent bed 112 is sandwiched between a set of filaments 196 adjacent the first airflow surface 60 and a set of filaments 196 adjacent the second airflow surface 62, when the sorbent bed 112 is installed between the sets of filaments 196. In the illustrated embodiment, the filaments 196 are threaded between the first and second side plates 124, 126 "shoelace style" such that the length of the sorbent bed cartridge 110 is uniformly spanned with spaced filaments 196.

Thus, a sorbent bed cartridge 10, 110 and a modular sorbent bed system 16 have been described that enable a method for forming the same. The mechanical process of fastening individual sorbent beds 12 into a modular array is simplified using the exoskeleton 18. One embodiment of assembly may include securing the sorbent beds 12 individually into the already formed exoskeleton 18. The exoskeleton 18 may be integrally molded into a unitary structure, or alternatively the individual plates of the exoskeleton 18 may be separately formed and then attached to form the exoskeleton 18. Another embodiment of assembly may include fastening one of the frame walls 42, 44, 46, 48 for each of the sorbent beds 12 to one of the plates 20, 22, 24, 26, then fastening an opposing one of the frame walls 42, 44, 46, or 48 to the opposing plate 20, 22, 24, or 26, and then fastening the remaining plates 20, 22, 24, or 26 to the remaining frame walls 42, 44, 46, 48 such that when they are all fastened together, the sorbent bed cartridge 10 is formed.

One regeneration technique usable with the modular sorbent bed system 16 employs RF, so in such a method the sorbent bed cartridges 10 are placed in a microwave and thus microwaves must be able to permeate through materials in the sorbent bed cartridge 10. For such a method, the exoskeleton 18 and frame 50 may thus be made of materials or combinations of materials suitable for RF such as polypropylene or similar RF transparent or low dielectric loss tangent material instead of metal. As these materials are relatively weak as compared to steel or other metallic alloy, the materials are more flexible and benefit from the intervention of the thickness control system 80, 180. While microwave regeneration is disclosed, methods of employing embodiments of the sorbent bed cartridge 10 are not limited to microwave regeneration. For example, embodiments of the sorbent bed cartridge 10 may also be employed in a method that uses steam regeneration. It should be understood that the sorbent bed cartridge could also be made of non-RF transparent or non-low dielectric loss tangent materials, such as, but not limited to metal, however it would then not be suitable for RF regeneration.

The chamber 14 does not need to employ any shelves or other internal cooperative features to receive the sorbent bed cartridges 10 therein. The benefits of having a simplified chamber 14 includes eliminating the actual material expense of such features, plus the advantageous removal of discontinuities on an internal face (pressure vessel wall) of chamber 14, thus preventing the creation of stress risers and complexities related thereto. Furthermore, the chamber 14 at least substantially eliminates arcing risk for RF desorption because the inside of the chamber 14 is devoid of internal features, shelves, sharp objects, edges, small gaps between a shelf and a contactor wall and any other discontinuities associated therewith, thus removing the potential for an arc to generate when RF energy is applied. The chamber 14 lacks any complicated internal features because the sorbent beds 12 are already held together in alignment within the exoskeleton 18, so the sorbent bed cartridge 10 can simply be inserted within the chamber 14.

This packaging is an efficient and effective method of positioning and securing individual solid sorbent beds 12 in a structured array. The sorbent beds 12 are constrained by the exoskeleton 18 in the preset array, such as the adjacent beds at angles, based on the pattern of openings 76 that optimizes airflow. The method also allows for maintaining the thickness of the sorbent beds 12 at the preselected thickness which is important for maintaining a consistent pressure drop and residence time (regardless of whether the preselected thickness is constant or variable as described above). The thickness control system 80, 180 accomplishes the maintenance of sorbent bed thickness by tensioning the frame 50 to hold the frame 50 and mesh 58 taught, and in some embodiments may further include spacers 184 and other thickness control features. This method also improves manufacturability (ease of assembly) and renders the sorbent beds 12 easier to handle as it allows for more efficient movement of filter arrays between adsorption and desorption stages for dynamic systems.

Also, it should be understood that the cartridges 10, 110 are not limited by orientation. For example, vertically orientated cartridges are within the scope of these embodiments.

Set forth below are some embodiments of the foregoing disclosure:

Embodiment 1: A sorbent bed cartridge including an exoskeleton having an interior space configured to receive a sorbent bed, and a thickness control system configured to at least substantially maintain a preselected thickness of the sorbent bed.

Embodiment 2: The sorbent bed cartridge as in any prior embodiment wherein the thickness control system includes a tensioning fastener, the tensioning fastener passable through the exoskeleton and the sorbent bed.

Embodiment 3: The sorbent bed cartridge as in any prior embodiment, wherein the tensioning fastener is configured to tighten a mesh supported by the sorbent bed, and at least a portion of the tensioning fastener is accessible from an exterior of the exoskeleton to enable tension adjustment.

Embodiment 4: The sorbent bed cartridge as in any prior embodiment wherein the tensioning fastener includes at least one of a screw, cap screw, ratcheting rivet and a stud and nut combination.

Embodiment 5: The sorbent bed cartridge as in any prior embodiment, wherein the tensioning fastener is included in a set of tensioning fasteners, wherein the tensioning fasteners enable at least substantial removal of bowing and/or sagging within the sorbent bed.

Embodiment 6: The sorbent bed cartridge as in any prior embodiment, further comprising openings within the exoskeleton configured to receive the set of tensioning fasteners, wherein the openings are arrayed in a pattern enabling securement of two adjacent sorbent beds at nonzero acute angles relative to each other within the exoskeleton.

Embodiment 7: The sorbent bed cartridge as in any prior embodiment, further comprising the sorbent bed, the sorbent bed having a frame, a mesh supported by the frame, the mesh having a first airflow surface and an opposing second airflow surface, and a sorbent material contained between the frame and the first and second airflow surfaces of the mesh.

Embodiment 8: The sorbent bed cartridge as in any prior embodiment, wherein the thickness control system includes a plurality of spacers spanning a distance from the first airflow surface to the second airflow surface.

Embodiment 9: The sorbent bed cartridge as in any prior embodiment, wherein the thickness control system includes a frame support beam, the frame support beam extending from opposing sides of the frame.

Embodiment 10: The sorbent bed cartridge as in any prior embodiment, wherein the frame includes a removable loading plate on a wall of the frame, the loading plate removable to load the sorbent material into the sorbent bed and securable to the wall of the frame to retain the sorbent material within the sorbent bed.

Embodiment 11: The sorbent bed cartridge as in any prior embodiment, wherein the sorbent bed is slidable within the exoskeleton and subsequently fastenable within the exoskeleton.

Embodiment 12: The sorbent bed cartridge as in any prior embodiment, wherein the thickness control system includes a tensioning fastener, the tensioning fastener passable through aligned openings in the frame and the exoskeleton after the sorbent bed is placed in the exoskeleton.

Embodiment 13: The sorbent bed cartridge as in any prior embodiment, wherein the frame is susceptible to bowing and/or sagging outside of the exoskeleton, and the tensioning fastener substantially reduces bowing and/or sagging in the frame when the sorbent bed is installed within the exoskeleton.

Embodiment 14: The sorbent bed cartridge as in any prior embodiment, wherein the exoskeleton includes a first end external plate, an opposing second end external plate, a first side plate, and an opposing second side plate, the first end plate including an opening for airflow into the interior.

Embodiment 15: The sorbent bed cartridge as in any prior embodiment, wherein the sorbent bed cartridge is at least substantially made of materials suitable for RF desorption.

Embodiment 16: A modular sorbent bed system comprising a chamber, the chamber sized to hold one or a plurality of the sorbent bed cartridges as in any prior embodiment, the one or the plurality of sorbent bed cartridges movable into and out of the chamber.

Embodiment 17: The modular sorbent bed system as in any prior embodiment, wherein the chamber is a desorb vessel and arcing risk is minimized within the chamber by shelf-free walls within the chamber, and wherein the sorbent bed cartridges are stackable within the chamber.

Embodiment 18: A method of forming the sorbent bed cartridge as in any prior embodiment, the method including securing the sorbent bed within the exoskeleton, and utilizing the thickness control system to maintain the preselected thickness of the sorbent bed.

Embodiment 19: The method as in any prior embodiment, further comprising selecting a material suitable for RF desorption for a frame of the sorbent bed and for the exoskeleton.

Embodiment 20: A sorbent bed cartridge including an exoskeleton having a first side plate, an opposing second side plate, a first end external plate, and an opposing second end external plate, the exoskeleton having an interior space configured to receive a plurality of sorbent beds in a predetermined array for carbon capture airflow, wherein the exoskeleton enables movement of the sorbent bed cartridge and the plurality of sorbent beds contained therein into and out of a chamber sized to hold a singular or plurality of the sorbent bed cartridges.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% of a given value.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A sorbent bed cartridge comprising:

an exoskeleton having an interior space configured to receive a sorbent bed; and a thickness control system configured to at least substantially maintain a preselected thickness of the sorbent bed, the thickness control system including a tensioning fastener, the tensioning fastener passable through the exoskeleton and the sorbent bed.

2. The sorbent bed cartridge of claim 1, wherein the tensioning fastener is configured to tighten a mesh supported by the sorbent bed, and at least a portion of the tensioning fastener is accessible from an exterior of the exoskeleton to enable tension adjustment.

3. The sorbent bed cartridge of claim 1 wherein the tensioning fastener includes at least one of a screw, cap screw, ratcheting rivet and a stud and nut combination.

4. The sorbent bed cartridge of claim 1, wherein the tensioning fastener is included in a set of tensioning fasteners, wherein the tensioning fasteners enable at least substantial removal of bowing and/or sagging within the sorbent bed.

5. The sorbent bed cartridge of claim 4, further comprising openings within the exoskeleton configured to receive the set of tensioning fasteners, wherein the openings are arrayed in a pattern enabling securement of two adjacent sorbent beds at nonzero acute angles relative to each other within the exoskeleton.

6. The sorbent bed cartridge of claim 1, further comprising the sorbent bed, the sorbent bed having a frame, a mesh supported by the frame, the mesh having a first airflow surface and an opposing second airflow surface, and a sorbent material contained between the frame and the first and second airflow surfaces of the mesh.

7. The sorbent bed cartridge of claim 6, wherein the thickness control system includes a plurality of spacers spanning a distance from the first airflow surface to the second airflow surface.

8. The sorbent bed cartridge of claim 6, wherein the thickness control system includes a frame support beam, the frame support beam extending from opposing sides of the frame.

9. The sorbent bed cartridge of claim 6, wherein the frame includes a removable loading plate on a wall of the frame, the loading plate removable to load the sorbent material into the sorbent bed and securable to the wall of the frame to retain the sorbent material within the sorbent bed.

10. The sorbent bed cartridge of claim 6, wherein the sorbent bed is slidable within the exoskeleton and subsequently fastenable within the exoskeleton.

11. The sorbent bed cartridge of claim 6, wherein the thickness control system includes a tensioning fastener, the tensioning fastener passable through aligned openings in the frame and the exoskeleton after the sorbent bed is placed in the exoskeleton.

12. The sorbent bed cartridge of claim 11, wherein the frame is susceptible to bowing and/or sagging outside of the exoskeleton, and the tensioning fastener substantially reduces bowing and/or sagging in the frame when the sorbent bed is installed within the exoskeleton.

13. The sorbent bed cartridge of claim 1, wherein the exoskeleton includes a first end external plate, an opposing second end external plate, a first side plate, and an opposing second side plate, the first end plate including an opening for airflow into the interior.

14. The sorbent bed cartridge of claim 1, wherein the sorbent bed cartridge is at least substantially made of materials suitable for RF desorption.

15. A modular sorbent bed system comprising a chamber, the chamber containing one or a plurality of the sorbent bed cartridges of claim 1, the one or the plurality of sorbent bed cartridges movable into and out of the chamber.

16. The modular sorbent bed system of claim 15, wherein the chamber is a desorb vessel and arcing risk is minimized within the chamber by shelf-free walls within the chamber, and wherein the sorbent bed cartridges are stackable within the chamber.

17. A method of forming the sorbent bed cartridge of claim 1, the method comprising:

securing the sorbent bed within the exoskeleton; and utilizing the thickness control system to maintain the preselected thickness of the sorbent bed.

18. The method of claim 17, further comprising selecting a material suitable for RF desorption for a frame of the sorbent bed and for the exoskeleton.

* * * * *